(12) United States Patent
Fujisawa et al.

(10) Patent No.: US 9,273,204 B2
(45) Date of Patent: Mar. 1, 2016

(54) UNCOATED HIGHLY REFLECTIVE IMPACT-RESISTANT INJECTION-MOLDED ARTICLE AND PROCESS FOR PRODUCING SAME

(75) Inventors: Tomoyuki Fujisawa, Tokyo (JP); Mihoko Yamamoto, Tokyo (JP); Hiroharu Itaya, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 143 days.

(21) Appl. No.: 13/824,827

(22) PCT Filed: Sep. 30, 2011

(86) PCT No.: PCT/JP2011/072548
§ 371 (c)(1),
(2), (4) Date: Mar. 18, 2013

(87) PCT Pub. No.: WO2012/043790
PCT Pub. Date: Apr. 5, 2012

(65) Prior Publication Data
US 2013/0184409 A1    Jul. 18, 2013

(30) Foreign Application Priority Data
Oct. 1, 2010    (JP) .................................. 2010-224419

(51) Int. Cl.
| | |
|---|---|
| C08L 33/12 | (2006.01) |
| C08L 25/06 | (2006.01) |
| C08L 33/20 | (2006.01) |
| C08L 51/00 | (2006.01) |
| C08L 69/00 | (2006.01) |
| B29C 45/00 | (2006.01) |
| C08L 101/00 | (2006.01) |
| C08L 33/10 | (2006.01) |
| C08L 55/02 | (2006.01) |
| C08F 279/02 | (2006.01) |
| C08F 279/04 | (2006.01) |
| C08L 25/12 | (2006.01) |

(52) U.S. Cl.
CPC ................. *C08L 33/12* (2013.01); *B29C 45/00* (2013.01); *C08F 279/02* (2013.01); *C08F 279/04* (2013.01); *C08L 25/06* (2013.01); *C08L 33/10* (2013.01); *C08L 33/20* (2013.01); *C08L 51/003* (2013.01); *C08L 55/02* (2013.01); *C08L 69/00* (2013.01); *C08L 101/00* (2013.01); *B29C 45/0001* (2013.01); *C08L 25/12* (2013.01); *C08L 2205/035* (2013.01); *C08L 2205/22* (2013.01)

(58) Field of Classification Search
None
See application file for complete search history.

(56) References Cited

U.S. PATENT DOCUMENTS

| | | |
|---|---|---|
| 5,124,193 A | 6/1992 | Sano et al. |
| 5,994,463 A | 11/1999 | Eckel et al. |
| 6,060,551 A | 5/2000 | Ooyama et al. |
| 6,140,426 A | 10/2000 | Sarabi et al. |
| 2004/0230003 A1 | 11/2004 | Hsu et al. |

FOREIGN PATENT DOCUMENTS

| | | |
|---|---|---|
| CN | 1195000 A | 10/1998 |
| JP | 2-311533 A | 12/1990 |
| JP | 5-043632 A | 2/1993 |
| JP | 10-235771 A | 9/1998 |
| JP | 10-273001 A | 10/1998 |
| JP | 11-080447 A | 3/1999 |
| JP | 2004-339357 A | 12/2004 |

OTHER PUBLICATIONS

International Search Report issued in PCT/JP2011/072548, mailed on Nov. 8, 2011.

*Primary Examiner* — Jeffrey Mullis
(74) *Attorney, Agent, or Firm* — Birch, Stewart, Kolasch & Birch, LLP

(57) ABSTRACT

An uncoated, highly reflective, impact-resistant injection-molded article which comprises a rubber ingredient (A) and a thermoplastic resin (B), characterized in that (1) the rubber ingredient (A) has been dispersed in the thermoplastic resin (B), (2) the rubber ingredient (A) has a coefficient of linear expansion of $12.5 \times 10^{-5}$ to $19 \times 10^{-5}$/° C., (3) the surface of the injection-molded article has a reflected-image clarity of 60-100%, and (4) the injection-molded article has a notched Charpy impact strength of 5-60 kJ/m².

1 Claim, No Drawings

UNCOATED HIGHLY REFLECTIVE IMPACT-RESISTANT INJECTION-MOLDED ARTICLE AND PROCESS FOR PRODUCING SAME

TECHNICAL FIELD

The present invention relates to an uncoated highly reflective impact-resistant injection-molded article having high image clarity and excellent impact resistance, and a process for producing the same.

BACKGROUND ART

Thermoplastic resins provided with impact resistance are widely used for household electrical appliances, game machines and interior materials for vehicles, etc. In recent years, products using such resins as materials are required not only to show performances of strength, impact resistance and the like but also to be very beautiful, and especially, image clarity has attracted attention. The image clarity means clearness of an image reflected on a surface, and for example, an image reflected on a piano or an image reflected on a high-grade black limousine may be imagined, and such an image may strongly give a sense of high quality. There are strong demands for such image clarity, and a variety of attempts have been made by material manufacturers and the like.

For example, a method for providing image clarity by coating a resin after subjecting it to a treatment for improving affinity between its surface and a coating composition has been known (Patent Literature 1).

Alternatively, a method for providing image clarity to a surface by forming a hard coat layer thereon by applying a thermosetting resin or an ionization-radiation curable resin and curing the resin has been known (Patent Literature 2).

CITATION LIST

Patent Literature

Patent Literature 1: JP 5-43632 A
Patent Literature 2: JP 10-235771 A

SUMMARY OF INVENTION

Technical Problem

It is, however, necessary to coat a resin in the invention described in Patent Literature 1, and hence, operations are complicated. Furthermore, an organic solvent such as a thinner occupying substantially a half of the coating composition is entirely released to the air in the form of a volatile organic compound. In addition, merely 30% to 70% of the coating composition is adhered onto an injection-molded article, and the balance is all disposed as waste. Therefore, this method has a problem in which it is environmentally unpreferable.

Alternatively, when the surface alone is molded as a separate matter as in the invention described in Patent Literature 2, not only production process is complicated but also integrality between a surface layer and an inner layer is lost over time, and hence, there arises a problem in which the image clarity is difficult to keep.

In this manner, it is actual state that the technique to provide high image clarity relies upon coating or a surface treatment. In particular, an impact-resistant resin containing a rubber component is difficult to be provided with excellent image clarity because of the influence of the flexible rubber component.

An object of the present invention is to provide an injection-molded article having impact resistance and showing excellent image clarity without coating, and a process for producing the same.

Solution to Problem

As a result of earnest studies, the present inventors have found that the aforementioned object can be achieved by an injection-molded article in which a rubber component, dispersed in a thermoplastic resin, has a coefficient of linear expansion falling in a specific range, and thus the present invention has been accomplished.

Advantageous Effects of Invention

According to the present invention, an uncoated highly reflective impact-resistant injection-molded article that has image clarity as high as that of special coating, has impact resistance and further shows scratch resistance can be obtained to be used for household electrical appliances, game machines and interior materials and the like for vehicles without requiring a complicated process such as coating or formation of a surface coat layer.

DESCRIPTION OF EMBODIMENTS

Specifically, the present invention provides the following:

[1] An uncoated highly reflective impact-resistant injection-molded article comprising a rubber component (A) and a thermoplastic resin (B),
wherein (1) the rubber component (A) is dispersed in the thermoplastic resin (B),
(2) the rubber component (A) has a coefficient of linear expansion of $12.5 \times 10^{-5}$ to $19 \times 10^{-5}/°C.$,
(3) the injection-molded article has a surface with image clarity of 60 to 100%, and
(4) the injection-molded article has notched Charpy impact strength of 5 to 60 $kJ/m^2$.

[2] The uncoated highly reflective impact-resistant injection-molded article according to [1], wherein a rubbery polymer portion contained in the rubber component (A) has a mass average particle size of 0.1 to 1.2 μm.

[3] The uncoated highly reflective impact-resistant injection-molded article according to [1] or [2], wherein an increase rate of an L* value in a fiber abrasion test is 60% or less.

[4] The uncoated highly reflective impact-resistant injection-molded article according to any one of [1] to [3], wherein a resistance value obtained under load of 20 g in a continuous loading surface property tester is 3 gf or less.

[5] A process for producing an uncoated highly reflective impact-resistant injection-molded article according to any one of [1] to [4], wherein injection molding is performed by using a mold having surface roughness Ra of 0.02 μm or less.

The rubber component (A) contained in the injection-molded article of the present invention is made of a rubbery polymer and/or a graft copolymer comprising a rubbery polymer and a graft constituent.

The rubbery polymer works to assist the injection-molded article to be released from a mold as well as to provide impact resistance to the injection-molded article. Furthermore, when it is used in combination with the thermoplastic resin (B), it works to provide both the impact resistance and image clarity to the injection-molded article. Examples of the rubbery polymer are diene rubber, acrylic rubber and ethylene rubber. Specific examples are polybutadiene, a styrene-butadiene copolymer, a block copolymer of styrene-butadiene, an acrylonitrile-butadiene copolymer, a butyl acrylate-butadiene copolymer, polyisoprene, a butadiene-methyl methacrylate copolymer, a butyl acrylate-methyl methacrylate copolymer, a butadiene-ethyl acrylate copolymer, an ethylene-propylene copolymer, an ethylene-propylene-diene copolymer, an ethylene-isoprene copolymer and an ethylene-methyl acrylate copolymer.

Among these rubbery polymers, polybutadiene, a styrene-butadiene copolymer, a block copolymer of styrene-butadiene, and an acrylonitrile-butadiene copolymer are preferably used from the viewpoint of impact resistance.

The rubbery polymer may have a uniform composition or may contain polymers having different compositions, or alternatively, may have a composition continuously changed.

If the rubber component (A) is made of a rubbery polymer comprising a graft constituent, the graft constituent is preferably a polymer that contains one or more monomers selected from aromatic vinyl monomers, vinyl cyanide monomers and acrylic monomers, which is bonded to the rubbery polymer. It is noted that the graft constituent may contain another copolymerizable monomer other than these monomers. Its graft ratio is preferably 200% or less, more preferably 50 to 170% and further preferably 60 to 150%. When the graft ratio falls in this range, the coefficient of linear expansion of the rubber component (A) can be controlled to be $12.5 \times 10^{-5}$ to $19 \times 10^{-5}/°$ C.

A graft ratio is defined as a ratio by mass of a graft constituent graft copolymerized with a rubbery polymer to mass of the rubbery polymer.

The graft ratio of the rubber component (A) can be obtained on the basis of a result of analysis performed as follows: A solvent soluble component is removed from the injection-molded article by using a solvent such as acetone, so as to take out the rubber component (A) as a solvent insoluble component, and the rubber component and the other components are analyzed with a Fourier transform infrared spectrophotometer (FT-IR).

The rubber component (A) contained in the injection-molded article of the present invention is in a form where it is dispersed in a continuous phase of the thermoplastic resin (B). The shape can be amorphous, a bar shape, a plate shape, a particle shape or the like, and is preferably in a particle shape from the viewpoint of the impact resistance. The rubber component may be dispersed in the continuous phase of the thermoplastic resin (B) either as respectively independently dispersed particles or as some aggregates of the dispersed particles, but the particles are preferably independently dispersed from the viewpoint of the impact resistance.

The size of the rubbery polymer contained in the rubber component (A) dispersed in the thermoplastic resin is, in terms of mass average particle size, preferably 0.1 µm or more from the view point of the mold release effect attained in producing the injection-molded article and preferably 1.2 µm or less from the viewpoint of the image clarity attained in the surface of the injection-molded article. The size is more preferably 0.15 to 0.8 µm, further preferably 0.15 to 0.6 µm, and particularly preferably 0.2 to 0.4 µm. The mass average particle size can be obtained by preparing an ultrathin section from the injection-molded article and analyzing an image of an arbitrary 50 µm×50 µm portion in the ultrathin section through observation with a transmission electron microscope (TEM).

Incidentally, the mass average particle size herein corresponds to a diameter when the rubbery polymer is in a spherical shape and corresponds to an average value of the largest dimension and the smallest dimension when it is not in a spherical shape.

If the rubber component (A) is made of the rubbery polymer, it contains a rubber component alone, but if it is made of a rubbery polymer containing a graft constituent, it sometimes has an inhomogeneous structure containing a rubber component and a resin component where the resin component is phase separated within the rubbery polymer as in, for example, a structure having an occlusion. When the rubbery polymer is in the form of particles having an occlusion, the mass average particle size of a rubbery polymer portion is measured with the occlusion included.

In the injection-molded article of the present invention, the rubber component (A) taken out of the injection-molded article should have a specific coefficient of linear expansion. The coefficient of linear expansion of the rubber component (A) is $12.5 \times 10^{-5}$ to $19 \times 10^{-5}/°$ C. and preferably $12.5 \times 10^{-5}$ to $17 \times 10^{-5}/°$ C. When the coefficient of linear expansion is $19 \times 10^{-5}/°$ C. or less, an injection-molded article showing excellent image clarity can be obtained. Besides, when the coefficient is $12.5 \times 10^{-5}/°$ C. or more, sufficient impact resistance can be attained.

The relationship between the coefficient of linear expansion of the rubber component and the image clarity of the injection-molded article can be understood as follows:

When the resin is molded, it is cooled from a high temperature at which it is in a molten state to a temperature at which it becomes solid, and at this point, the rubber component, which has been compressed and deformed when the temperature is high, tries to restore from the deformation when it is cooled. This process affects the surface of the injection-molded article, and hence, the image clarity of the injection-molded article is degraded. Therefore, the coefficient of linear expansion of the rubber component is set to fall within the specific range, so as to minimally deform the rubber component, and as a result, the degradation of the image clarity can be prevented.

The coefficient of linear expansion of the rubber component (A) is measured with the rubber component (A) isolated from a composition or the injection-molded article containing the rubber component (A).

In order to take the rubber component (A) out from the injection-molded article, a solvent that dissolves the resin component but does not dissolve the rubber component is selected, and the resin portion of the injection-molded article is dissolved with the solvent so as to take out the rubber component (A). For example, if the rubber component is made of polybutadiene, a styrene-butadiene copolymer, a styrene-butadiene-styrene block copolymer or the like and the thermoplastic resin (B) is made of polystyrene, an MS resin, an AS resin, an acrylic resin or the like, acetone can be used as the solvent. Even if the injection-molded article contains a rubbery polymer and a thermoplastic resin other than the aforementioned materials, an appropriate solvent can be easily selected depending upon their compositions.

A method for controlling the coefficient of linear expansion of the rubber component (A) is described below.

The coefficient of linear expansion of the rubber component (A) can be controlled to be smaller by any of the following methods:

1) in which the graft ratio of the rubber component (A) is increased;
2) in which the degree of crosslinking of the rubbery polymer contained in the rubber component (A) is increased; and 3) in which the glass transition temperature (Tg) of the rubbery polymer contained in the rubber component (A) is increased.

When the method 1) is employed, the coefficient of linear expansion can be controlled without largely relying upon the degree of crosslinking and the Tg of the rubbery polymer. The graft ratio can be adjusted, in preparing the rubber component (A), by increasing/decreasing the mass of monomers to be graft polymerized on the basis of the mass of the rubbery polymer.

On the other hand, when the coefficient of linear expansion of the rubber component (A) is controlled by the method 2), a swelling index is used as an index corresponding to the degree of crosslinking of the rubbery polymer. The swelling index is preferably 10 to 80% and more preferably 15 to 60%. When the swelling index is controlled to fall in this range, the coefficient of linear expansion of the rubber component (A) can be controlled to fall in the preferable range. The swelling index can be controlled, if the rubbery polymer is prepared through, for example, emulsion polymerization, by employing a method of, for example, setting a polymerization temperature high, increasing a degree of polymerization conversion attained in completing the polymerization, or performing the polymerization with a monomer/polymer concentration ratio under polymerization set to be small. Thus, the swelling index is lowered, so as to increase the degree of crosslinking. Alternatively, when a crosslinkable monomer such as divinyl benzene is used to be copolymerized, the swelling index can be lowered.

When the method 3) is employed, a rubbery polymer having a Tg of preferably approximately −100 to 0° C. is used from the viewpoint of the impact resistance. The Tg is more preferably −20 to −90° C. When the Tg of the rubbery polymer is made close to the upper limit of 0° C. by adjusting the compositions of monomers contained in the rubbery polymer, the coefficient of linear expansion can be reduced. As a method for controlling the Tg of the rubbery polymer, a copolymer is used as the rubbery polymer and the composition ratio of the copolymer is adjusted. In using, for example, a styrene-butadiene block copolymer, the Tg of the rubbery polymer can be increased by lowering the ratio of butadiene in a block portion principally containing butadiene.

The coefficient of linear expansion of the rubber component (A) can be controlled by employing a single one of or a combination of the methods 1) to 3). Among these methods, the control method utilizing a graft ratio is preferably employed because balance between the image clarity and the impact resistance can be easily attained by this method.

The thermoplastic resin (B) of the present invention is an injection moldable resin capable of providing the impact resistance and the image clarity to the injection-molded article when used together with the rubber component (A).

In addition, it may also provide practically necessary strength, hardness and heat resistance to the injection-molded article.

As such a thermoplastic resin, amorphous thermoplastic resins are preferably used from the viewpoint of compatibility with the rubber component (A). Besides, when an amorphous thermoplastic resin having a glass transition temperature (Tg) of 90 to 300° C. is selected, an injection-molded article also having practically necessary strength, hardness and heat resistance can be obtained. Examples of such a resin are polystyrene, an AS resin, a methacrylic resin, an MS resin, a polycarbonate resin and an aromatic polyether resin. One of these resins can be singly used or some of them can be used in combination.

It is noted that the thermoplastic resin (B) of the present invention has reduced viscosity (ηsp/c) of preferably 0.2 to 1.5 dl/g and more preferably 0.3 to 0.8 dl/g. When the reduced viscosity is 0.2 or more, the impact resistance and the strength can be prevented from lowering, and when the reduced viscosity is 1.5 or less, sufficient moldability can be attained.

In the injection-molded article of the present invention, assuming that the total content of the rubber component (A) and the thermoplastic resin (B) is 100 mass %, the content of the rubber component (A) is preferably 20 to 50 mass % and more preferably 25 to 40 mass %.

The content of the rubber component (A) is preferably 20 mass % or more from the viewpoint of the impact resistance and the mold release property of the molded article attained in the injection molding.

On the other hand, the content of the rubber component (A) is preferably 50 mass % or less from the viewpoint that the injection-molded article can easily show the effect of scratch resistance.

Furthermore, when the compatibility is improved by adjusting the composition of the thermoplastic resin (B) and the composition of the graft constituent of the rubber component (A) in the present invention, the dispersion state of the rubbery polymer can be improved, so that the impact resistance, the image clarity and the scratch resistance of the injection-molded article can be well balanced. Examples of a preferable combination of the thermoplastic resin (B) and the graft constituent contained in the rubber component (A) are as follows:

If the thermoplastic resin (B) contains a vinyl cyanide monomer, the graft portion of the rubber component (A) preferably has a composition also containing a vinyl cyanide monomer, and the content of the vinyl cyanide monomer in each of the graft constituent of the rubber component (A) and the thermoplastic resin (B) is preferably 15 mass % to 45 mass %.

If the thermoplastic resin (B) is a mixture of a copolymer of an aromatic vinyl monomer and a vinyl cyanide monomer and a copolymer of a methacrylic monomer and an acrylic monomer, the content of the vinyl cyanide monomer in each of the graft constituent of the rubber component (A) and the thermoplastic resin (B) is preferably 15 to 30 mass %. Furthermore, from the viewpoint of the image clarity, the content of methyl methacrylate in the copolymer of the acrylic monomer is preferably 75 to 98 mass % and more preferably 85 to 98 mass %.

If the thermoplastic resin (B) is a copolymer of an aromatic vinyl monomer and a vinyl cyanide monomer or a terpolymer of an aromatic vinyl monomer, a vinyl cyanide monomer and an acrylic monomer, the content of the vinyl cyanide monomer in each of the graft constituent of the rubber component (A) and the thermoplastic resin (B) is preferably 30 to 45 mass %. If an acrylic monomer is contained, from the viewpoint of the image clarity, the content of the acrylic monomer in each of the graft constituent of the rubber component (A) and the thermoplastic resin (B) is preferably 5 to 20 mass %. Since the presence of the acrylic monomer improves flow properties, an injection-molded article having high image clarity can be thus easily obtained. Among acrylic monomers, butyl acrylate or butyl methacrylate is preferably used.

The injection-molded article of the present invention may contain a lubrication assistant (C) as a raw material other than the rubber component (A) and the thermoplastic resin (B). A lubrication assistant is used for providing a lubricating property to the surface of the injection-molded article. The content of the lubrication assistant (C) is preferably 0.05 to 2 mass % based on the total mass of the rubber component (A) and the thermoplastic resin (B) from the viewpoint of the impact resistance. When the lubrication assistant (C) is contained, a better result can be attained in a fiber abrasion test.

Examples of the lubrication assistant (C) are lubricants such as aliphatic metal salts, polyolefins, a polyester elastomer and a polyamide elastomer.

As the aliphatic metal salts and the like, at least one or more lubricants having a fatty acid metal salt and an amide group or an ester group is preferably contained from the viewpoint of the scratch resistance.

A fatty acid metal salt is a salt of a fatty acid and a metal containing one or more selected from sodium, magnesium, calcium, aluminum and zinc.

Specific examples are sodium stearate, magnesium stearate, calcium stearate, aluminum (mono-, di- or tri-) stearate, zinc stearate, sodium montanate, calcium montanate, calcium ricinoleate and calcium laurate, among which sodium stearate, magnesium stearate, calcium stearate and zinc stearate are preferred.

Particularly preferably, stearic acid metal salts are used, and specifically, calcium stearate is preferably used from the viewpoint of the scratch resistance.

Examples of the polyolefins are compositions produced from at least one of ethylene, propylene, α-olefin and the like, and the polyolefins include compositions derived from these compositions.

Specific examples are polypropylene, an ethylene-propylene copolymer, (high density, low density or linear low density) polyethylene, oxidized polyolefin and graft polyolefin.

Among these polyolefins, oxidized polyolefin wax and polyolefin grafted with a styrene resin are preferred from the viewpoint of the scratch resistance, and more preferably, polypropylene wax, polyethylene wax, oxidized polypropylene wax, oxidized polyethylene wax, acrylonitrile-styrene copolymer graft polypropylene, acrylonitrile-styrene copolymer graft polyethylene, styrene polymer graft polypropylene and styrene polymer graft polyethylene are used.

Examples of the polyester elastomer are polyesters obtained through condensation polymerization of a dicarboxylic acid compound and a dihydroxy compound, through ring-opening condensation polymerization of an oxycarboxylic acid compound and a polycondensation lactone compound, or through condensation polymerization of a mixture of these component compounds. Either of homopolyester or copolyester can be used.

Examples of the dicarboxylic acid compound are aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethane dicarboxylic acid and sodium 3-sulfoisophthalate; aliphatic dicarboxylic acids such as 1,4-cyclohexane dicarboxylic acid, 1,2-cyclohexane dicarboxylic acid and dicyclohexyl-4,4-dicarboxylic acid; aliphatic dicarboxylic acids such as diphenyl ether dicarboxylic acid, diphenyl ethane dicarboxylic acid, succinic acid, oxalic acid, adipic acid, sebacic acid, and dodecane dicarboxylic acid; and mixtures of any of these dicarboxylic acids, and the dicarboxylic acid compound also includes alkyl-, alkoxy- or halogen-substituted derivatives of these dicarboxylic acids. Furthermore, such a dicarboxylic acid compound can be used in the form of a derivative capable of forming an ester, for example, in the form of a lower alcohol ester such as dimethyl ester. In the present invention, one of these dicarboxylic acid compounds can be singly used or two or more of them can be used in combination.

Among the aforementioned dicarboxylic acid compounds, terephthalic acid, isophthalic acid, 1,4-cyclohexane dicarboxylic acid, sebacic acid, adipic acid and dodecane dicarboxylic acid are preferably used from the viewpoint of a polymerization property, a color tone and the impact resistance.

Examples of the dihydroxy compound are ethylene glycol, propylene glycol, butane diol, neopentyl glycol, butene diol, hydroquinone, resorcin, dihydroxy diphenyl ether, cyclohexane diol, hydroquinone, resorcin, dihydroxy diphenyl ether, cyclohexane diol and 2,2-bis(4-hydroxyphenyl)propane; and polyoxyalkylene glycols thereof, and alkyl-, alkoxy- or halogen-substituted derivatives thereof. One of these dihydroxy compounds can be singly used, or two or more of them can be used in combination.

Examples of the oxycarboxylic acid compound are oxybenzoic acid, oxynaphthoic acid and diphenylene oxycarboxylic acid, and the oxycarboxylic acid compound also includes alkyl-, alkoxy- and halogen-substituted derivatives of these compounds. One of these oxycarboxylic acid compounds can be singly used, or two or more of them can be used in combination. Alternatively, a lactone compound such as ε-caprolactone can be used for producing the polyester elastomer.

Examples of the polyamide elastomer are aminocarboxylic acid or lactam having a carbon number of 6 or more, and nylon mn salts in which m+n is 12 or more, and examples of a hard segment (X) thereof are aminocarboxylic acids such as ω-aminocaproic acid, ω-aminoenan acid, ω-aminocapryl acid, ω-aminobergon acid, ω-amino capric acid, 11-aminoundecanoic acid and 12-aminododecanoic acid; lactams such as caprolactam and laurolactam; and nylon salts such as nylon 6,6, nylon 6,10, nylon 6,12, nylon 11,6, nylon 11,10, nylon 12,6, nylon 11,12, nylon 12,10, and nylon 12,12.

Furthermore, examples of a soft segment (Y) of polyol or the like are polyethylene glycol, poly(1,2- and 1,3-propyleneoxide) glycol, poly(tetramethylene oxide) glycol, poly(hexamethylene oxide) glycol, a block or random copolymer of ethylene oxide and propylene oxide, and a block or random copolymer of ethylene oxide and tetrahydrofuran.

Such a soft segment (Y) has a number average molecular weight of $2.0 \times 10^2$ to $6.0 \times 10^3$ and preferably of $2.5 \times 10^2$ to $4.0 \times 10^3$.

It is noted that poly(alkylene oxide) glycol having both terminals aminated or carboxylated can be used.

Among these lubrication assistants (C), a combination of a stearic acid metal salt and a wax is particularly preferably used from the viewpoint of the scratch resistance.

When the lubrication assistant (C) is contained, an acid-modified or epoxy-modified resin can be mixed for improving the compatibility. Besides, part of the rubber component (A) and the thermoplastic resin (B) can be modified with an acid or an epoxy as long as the image clarity is not spoiled. As an example of such modification, if the thermoplastic resin (B) is a copolymer of monomers selected from the aromatic vinyl monomers, the vinyl cyanide monomers and the acrylic monomers, a vinyl monomer having a carboxyl group or a glycidyl group is copolymerized with these monomers.

Examples of the vinyl monomer having a carboxyl group are unsaturated compounds having a free carboxyl group such as acrylic acid, crotonic acid, cinnamic acid, itaconic acid and maleic acid; and unsaturated compounds having an anhydride carboxyl group such as maleic anhydride, itaconic anhydride, chloromaleic anhydride and citraconic anhydride, among which acrylic acid, methacrylic acid and maleic anhydride are suitably used from the viewpoint of the scratch resistance.

Examples of the vinyl monomer having a glycidyl group are glycidyl methacrylate, glycidyl acrylate, allyl glycidyl ether, methyl glycidyl ether and methyl glycidyl methacrylate, among which glycidyl methacrylate is suitably used from the viewpoint of the scratch resistance.

Moreover, in the injection-molded article of the present invention, additives such as UV absorbers and antioxidants prepared from phosphite, hindered phenol, benzotriazole, benzophenone, benzoate and cyanoacrylate; lubricants and plasticizers prepared from higher fatty acids, acid esters, acid amides, higher alcohols and the like; a mold release agent of montanoic acid, a salt thereof, an ester thereof or a half ester thereof, stearyl alcohol, steramide, ethylene wax or the like; a color protection agent of phosphite, hypophosphite or the like; a nucleating agent; an antistatic agent prepared from amine, sulfonic acid, polyether or the like; and a phosphorus or halogen flame retardant of 1,3-phenylenebis(2,6-dimethylphenyl=phosphate), tetraphenyl-m-phenylenebisphosphate, phenoxyphosphoryl, phenoxyphosphazene or the like can be used as raw materials as long as the effects of the present invention are not spoiled. The content of each of these additives is preferably 0.05 to 1 mass % from the viewpoint of weather resistance.

For the purpose of providing designability, the injection-molded article of the present invention can contain known coloring agents such as an inorganic pigment, an organic pigment, a metallic pigment and a dye. Among such coloring agents, those for coloring the injection-molded article in white, black or red are preferably used because these coloring agents can make the design of the injection-molded article remarkably luxury.

Examples of the inorganic pigment are titanium oxide, carbon black, titanium yellow, an iron oxide pigment, ultramarine blue, cobalt blue, chromium oxide, spinel green, a lead chromate pigment and a cadmium pigment.

Examples of the organic pigment are azo pigments such as an azo lake pigment, a benzimidazolone pigment, a diarylide pigment and a condensation azo pigment; phthalocyanine pigments such as phthalocyanine blue and phthalocyanine green; and condensation polycyclic pigments such as an isoindolinone pigment, a quinophthalone pigment, a quinacridone pigment, a perylene pigment, an anthraquinone pigment, a perinone pigment and dioxazine violet.

Examples of the metallic pigment are a scaly aluminum metallic pigment, a spherical aluminum pigment used for improving weld appearance, a mica powder for a pearl metallic pigment, and in addition, polyhedral particles of an inorganic substance such as glass coated with a metal by plating or sputtering.

Examples of the dye are a nitroso dye, a nitro dye, an azo dye, a stilbene azo dye, a keto imine dye, a triphenyl methane dye, a xanthene dye, an acridine dye, a quinoline dye, a methine/polymethine dye, a thiazole dye, an indamine/indophenol dye, an azine dye, an oxazine dye, a thiazin dye, a sulfur dye, an aminoketone/oxyketone dye, an anthraquinone dye, an indigoid dye and a phthalocyanine dye.

One of these coloring agents can be singly used or two or more of them can be used in combination.

The content of the coloring agent is preferably 0.05 to 2 mass % and more preferably 0.1 to 1.5 mass % from the viewpoint of the color tone.

The injection-molded article of the present invention has image clarity of 60 to 100% and notched Charpy impact strength of 5 to 60 kJ/m$^2$. The image clarity is preferably 90 to 100% and more preferably 95% or more. The notched Charpy impact strength is preferably 7 to 50 kJ/m$^2$ and more preferably 8 to 30 kJ/m$^2$.

The image clarity is a source of beauty of the injection-molded article, and when it is 60% or more, it generally gives a sense of high quality.

Furthermore, when the notched Charpy impact strength is 5 kJ/m$^2$ or more, the article can be used for a household electrical appliance, a game machine or an interior material for a vehicle, etc., without causing any practical problems. On the other hand, when it is 60 kJ/m$^2$ or less, satisfactory image clarity can be easily attained at the same time.

The injection-molded article of the present invention is realized to be uncoated and highly reflective, and practically, it is necessary that the image clarity is not lowered through a cleaning/wiping operation or the like at a level generally performed in daily use. It is because faint scratches are caused on the surface of an injection-molded article that the image clarity is lowered. As a barometer of image clarity retainability, namely, the scratch resistance, a fiber abrasion test can be employed. The fiber abrasion test is a test for determining the degree of scratches by rubbing a surface of an injection-molded article with a tissue. Through evaluation of the test performed by rubbing the surface through 20 reciprocating motions at a rubbing load of 500 g, a stroke of 60 mm and a speed of 50 mm/sec, a daily conducted cleaning/wiping operation for the injection-molded article can be reproduced. When increase of an L* value of the surface of the injection-molded article attained after the test, as compared with the value obtained before the test, is preferably 60% or less, no practical problem occurs in daily use. The increase of the L* value is more preferably 30% or less and particularly preferably 5% or less.

In order to attain the increase of the L* value of the surface of the injection-molded article in the fiber abrasion test falling in the preferable range, the coefficient of linear expansion of the rubber component (A) is set within the range of $12.5 \times 10^{-5}$ to $19 \times 10^{-5}$, and a resin having high hardness is selected as the thermoplastic resin (B). As the high hardness, for example, Rockwell hardness on the M scale of 40 to 105 is preferable and 50 to 105 is more preferable.

Preferable examples of the thermoplastic resin (B) are:

i) a copolymer of at least two or more monomers selected from aromatic vinyl monomers, vinyl cyanide monomers and acrylic monomers;

ii) a polycarbonate copolymer with high hardness; and iii) polyphenylene ether.

One of these components can be singly used or a plurality of them can be used together.

Examples of the aromatic vinyl monomers are styrene, α-methyl styrene, o-methyl styrene, p-methyl styrene, o-ethyl styrene, p-ethyl styrene, p-t-butyl styrene and vinyl naphthalene. Especially, styrene and α-methyl styrene are preferably used. One of these monomers or two or more of them can be used.

Examples of the vinyl cyanide monomers are acrylonitrile, methacrylonitrile and ethacrylonitrile, and especially, acrylonitrile is preferably used. One of these monomers or two or more of them can be used.

Examples of the acrylic monomers are unsaturated alkyl carboxylate monomers such as methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, 2-hydroxyethyl (meth)acrylate, 3-hydroxypropyl (meth)acrylate, 2,3,4,5,6-pentahydroxyhexyl (meth)acrylate and 2,3,4,5-tetrahydroxypentyl (meth)acrylate; and (meth)acrylic acid, and one of these monomers or a combination of two or more of them can be used.

Incidentally, if the acrylic monomers contain methyl methacrylate, the content of the methyl methacrylate in the acrylic monomers is preferably 80 to 94 mass % and more preferably 85 to 91 mass % from the viewpoint of the image clarity.

If a copolymer of monomers selected from the aromatic vinyl monomers, the vinyl cyanide monomers and the acrylic monomers is used as the thermoplastic resin (B), another copolymerizable monomer can be copolymerized for use if necessary. Examples of another copolymerizable monomer are maleic anhydride, N-substituted maleimide monomers such as N-phenylmaleimide and N-methylmaleimide, and glycidyl group-containing monomers such as glycidyl methacrylate. One of these monomers or two or more of them can be used. Especially, N-phenylmaleimide is preferably used because it can provide the heat resistance without spoiling the other properties.

As the polycarbonate resin, either of aromatic homopolycarbonate and aromatic copolycarbonate can be used. A process for producing polycarbonate resin is, for example, a phosgene method in which phosgene is blown into a bifunctional phenol compound in the presence of a caustic alkali and a solvent, or an ester exchange method in which ester exchange is conducted between a bifunctional phenol compound and diethyl carbonate in the presence of a catalyst. Here, examples of the bifunctional phenol compound are 2,2'-bis(4-hydroxyphenyl)propane, 2,T-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane and 1-phenyl-1,1'-bis(4-hydroxyphenyl)ethane. Especially, a compound having a structure containing 2,2'-bis(4-hydroxyphenyl)propane [bisphenol A] or the like as a base and a functional group capable of providing hardness introduced thereinto is preferably used. In the present invention, one of such bifunctional phenol compounds can be singly used or some of them can be used at the same time.

Although the polycarbonate resin can be singly used, from the viewpoint of the hardness of the thermoplastic resin (B), it is preferably used in combination with the aforementioned copolymer of at least two or more monomers selected from the aromatic vinyl monomers, the vinyl cyanide monomers and the acrylic monomers.

If a polycarbonate copolymer with high hardness is used, specifically, if, for example, aromatic copolycarbonate with high hardness can be used, for example, a copolymer described in JP 8-183852 A, that is, copolycarbonate containing a unit derived from two or more aromatic dihydroxy compounds and containing 50 to 99 mol % of a constitutional unit represented by the following Formula [1], can be used:

[Formula 1]

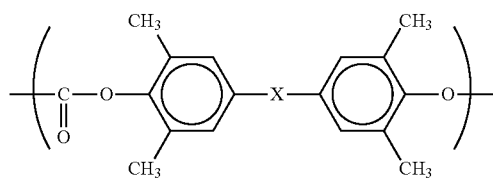

(wherein X is

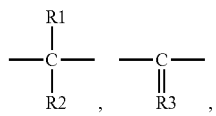

—O—, —S—, —SO— or —SO$_2$—, each of R1 and R2 is a hydrogen atom or a hydrocarbon group with a valence of 1, and R3 is a hydrocarbon group with a valence of 2.)

When the polyphenylene ether is used, it can be produced by production processes described in, for example, U.S. Pat. Nos. 3,306,874, 3,306,875, 3,257,357 and 3,257,358, JP 50-51197 A and JP 63-152628 A. Specifically, the polyphenylene ether is obtained through oxidative coupling of a phenol compound and contains a homopolymer and a copolymer.

Specific examples of the polyphenylene ether are poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether), as well as polyphenylene ether copolymers such as a copolymer of 2,6-dimethylphenol and another phenol (for example, a copolymer with 2,3,6-trimethylphenol and a copolymer with 2-methyl-6-butylphenol as described in JP 52-17880 B).

Among these examples, a particularly preferable polyphenylene ether is poly(2,6-dimethyl-1,4-phenylene ether), a copolymer of 2,6-dimethylphenol and 2,3,6-trimethylphenol, or a mixture thereof.

As the thermoplastic resin (B), one of these resins can be singly used or some of them can be used in combination.

In order to attain the effect of the scratch resistance in the injection-molded article of the present invention, it is more preferable to attain a resistance value under load of 20 g of 3 gf or less in a continuous loading surface property tester. The resistance value is more preferably 2.5 gf or less and most preferably 2.0 gf or less. For reducing a value measured with the continuous loading surface property tester, it is effective to reduce the coefficient of linear expansion of the rubber component (A).

Besides, in the injection-molded article of the present invention, the content of a volatile component having a boiling point of 200° C. or less is preferably 1500 ppm or less. When the content of the volatile component is 1500 ppm or less, the image clarity is minimally lowered even after a long period of time.

A volatile component contained in the thermoplastic resin (B) or the rubber component is a raw material monomer remaining in the resin or the rubber, a solvent used in the production process or the like and is, for example, an aromatic vinyl monomer, a vinyl cyanide monomer or an acrylic monomer. Alternatively, it is an additive or the like containing an ingredient having a boiling point of 200° C. or less.

The injection-molded article of the present invention preferably has surface roughness (Ra) of 0.1 or less. When the surface roughness of the injection-molded article is small, the image clarity is liable to be high. The surface roughness of the injection-molded article is varied depending upon the surface roughness of a used mold and molding conditions. When, for example, the surface roughness of the mold is small, a molding temperature is high and a molding pressure is low, the surface roughness of the resultant injection-molded article is liable to be small.

(Production Process for Rubber Component (A))

As the production process for the rubbery polymer contained in the rubber component (A), block polymerization, solution polymerization, suspension polymerization, block suspension polymerization, emulsion polymerization or the like can be employed. Among these processes, the emulsion polymerization, the suspension polymerization or the block suspension polymerization is preferably employed because the rubber component can be obtained in the form of particles and the particle size can be easily controlled in employing these processes.

If polymers having a plurality of Tg are used as the rubbery polymer, it can be produced through polymerization of polymers having different monomer compositions performed in multiple stages. It is preferred that the rubbery polymer is produced through multistage polymerization by employing the emulsion polymerization.

Alternatively, when the rubbery polymer is a polymer having a composition gradient, it can be polymerized with monomer compositions continuously changed. For example, what is called a power feed method can be employed in the emulsion polymerization for producing such a polymer.

When the rubbery polymer is a block copolymer of an aromatic vinyl monomer and a diene vinyl monomer, and specifically, when it is, for example, a styrene-butadiene block copolymer, it can be produced through living anion polymerization performed in a solution.

As a process for producing a rubbery polymer containing a graft constituent, the block polymerization, the solution polymerization, the suspension polymerization, the block suspension polymerization, the emulsion polymerization or the like can be employed. Among these processes, when the emulsion polymerization is employed for the production, a heat decomposable initiator for thermally generating radicals or a redox initiator can be used.

In employing the emulsion polymerization, a rubbery polymer separately obtained, for example, by the emulsion polymerization is used for further emulsion polymerizing a vinyl monomer. The graft constituent thus obtained is preferably compatible with the thermoplastic resin (B) from the viewpoint of the impact resistance.

Incidentally, after producing the rubbery polymer in the form of particles, the graft polymerization may be continuously conducted in the same reactor, or may be conducted separately after isolating the rubber particles once as a latex.

Specifically, for example, a polybutadiene latex obtained through the emulsion polymerization is subjected to radical initiated graft polymerization with one of or two or more of monomers selected from aromatic vinyl monomers, vinyl cyanide monomers and acrylic monomers.

Examples of the one of or two or more of monomers are monomers including a combination of styrene and acrylonitrile, a combination of styrene and methyl methacrylate, styrene, methyl methacrylate, and acrylonitrile. As a radical initiator, an initiator such as peroxodisulfate or t-butylperoxy-2-ethylhexanoate can be used.

When the solution polymerization is employed, for example, a non-crosslinking rubbery polymer is obtained through the living anion polymerization of a diene monomer, and thereafter, the rubbery polymer is dissolved with a styrene monomer or a styrene-acrylonitrile monomer for polymerization, so as to separate a composite of a rubber component and a resin component with a high Tg.

As a production process for the thermoplastic resin (B), the block polymerization, the solution polymerization, the suspension polymerization, the block suspension polymerization, the emulsion polymerization or the like can be employed. The copolymer of at least two or more monomers selected from the aromatic vinyl monomers, the vinyl cyanide monomers and the acrylic monomers is preferably produced through radical polymerization.

A production process for the injection-molded article of the present invention is described below.

The injection-molded article of the present invention is produced through a step of preparing a composition by melting the thermoplastic resin (B) and kneading it with the rubber component (A); and an injection molding step.

(Method for Kneading Rubber Component (A) and Thermoplastic Resin (B))

The rubber component (A) and the thermoplastic resin (B) can be kneaded by, for example, a melt kneading method using a mixer such as an open roll mixer, an intensive mixer, an internal mixer, a Ko-kneader, a twin rotor continuous mixer or an extruder. A single screw or twin screw extruder is generally used.

As a method for supplying the rubber component (A) and the thermoplastic resin (B) to a melt kneading machine, all the components can be supplied to the same supply port at one time, or the components can be supplied respectively through different supply ports. For example, an extruder having two supply ports can be used for the melt kneading, with the thermoplastic resin (B) supplied through a main supply port disposed on a side of a base of a screw and with the rubber component (A) supplied through a sub supply port disposed between the main supply port and a tip of the extruder.

If the rubber component (A) and the thermoplastic resin (B) are supplied through the same supply port, these components is precedently mixed before putting them in an extruder hopper for kneading.

A preferable melt kneading temperature is varied depending upon the type of thermoplastic resin (B). With regard to a cylinder set temperature, a preferable temperature is 290 to 330° C. in using, for example, PPE and is approximately 180 to 270° C. in using an AS resin.

Furthermore, if an extruder is used, with regard to a cylinder temperature, it is preferably set at 30 to 200° C. in a supply zone, and in a kneading zone where the melt kneading is performed, it is set at a temperature within a range of a melting point +30° C. to +100° C. in using a crystalline resin and at a temperature within a range of a Tg +60° C. to +150° C. in using an amorphous resin. When the temperature is thus set in two stages, the rubber component (A) and the thermoplastic resin (B) can be smoothly kneaded, resulting in attaining much higher image clarity of the surface of the injection-molded article.

Time for the melt kneading is preferably approximately 0.5 to 5 minutes.

Moreover, in producing the resin composition through the extrusion, the content of the volatile component having a boiling point of 200° C. or less in the resin composition is preferably 1500 ppm or less at a stage of supplying the composition to an injection molding machine. The volatile component is preferably sucked through, for example, a vent port provided between a center portion of the cylinder of a twin screw extruder and a tip of the extruder at a degree of vacuum of −100 to −800 hPa.

The extruded resin composition can be directly cut into pellets or formed into strands so as to be subsequently cut into pellets with a pelletizer. The pellets can be in a general shape such as a cylindrical shape, a prism shape or a spherical shape, and cylindrical pellets are suitably employed.

The injection-molded article of the present invention is molded with an injection molding machine. As the injection molding, injection compression molding, gas-assisted molding using a nitrogen gas or a carbon dioxide gas, rapid heat cycle molding performed with a mold temperature set at higher temperature or the like can be employed. These molding processes can be employed in combination. Preferably, the gas-assisted molding, the rapid heat cycle molding or a combination of the gas-assisted molding and the rapid heat cycle molding is employed.

The gas-assisted molding herein means injection molding using a generally known nitrogen or carbon dioxide gas, and examples of this process are a method as described in JP 57-14968 B or the like in which a compressed gas is injected into a molding after a resin is injected into a mold cavity, a method as described in Japanese Patent No. 3819972 or the like in which a compressed gas is injected into a cavity corresponding to one face of a molding after injecting a resin into a mold cavity, and a method as described in Japanese Patent No. 3349070 in which a gas is precedently filled in a thermoplastic resin prior to molding. Among these methods, the method in which a compressed gas is injected into a cavity corresponding to one face of a molding is preferably employed.

In the present invention, dwell pressure application for preventing sink marks and warping is preferably performed in a gas-assisted manner. If the dwell pressure application for preventing sink marks and warping is performed by using a resin, since the mold temperature is comparatively high, burrs are easily caused, and in addition, sink marks and warping can not be prevented unless time for applying the dwell pressure is long.

The pellets prepared as described above can be used as a kneaded mixture of the rubber component (A), the thermoplastic resin (B) and the other additives, so as to be charged in the injection molding machine to mold the injection-molded article. As a mold of the molding machine, a mold finished with a file of a grit size of #4000 or finer and preferably of #12000 or finer is used. The mold has arithmetical mean surface roughness Ra of preferably 0.02 μm or less and more preferably 0.01 μm or less. When a mold having such surface roughness Ra is used, the image clarity of the surface of the injection-molded article can be 60% or more.

A method for obtaining such a surface of the mold is not particularly limited, and the surface roughness can be adjusted by polishing the surface with a ultrasonic grinding machine or manually by using a diamond file, a whetstone, a ceramic stone, a ruby stone, a GC grindstone or the like.

Besides, a steel material for the mold to be used is preferably quenched and tempered steel with a hardness of 40 HRC or more and more preferably 50 HRC or more.

Instead of polishing the mold, a chrome plated die can be used, or a mold polished as described above and plated with chrome can be used.

The injection molding is performed preferably with a mold temperature set at a temperature in the vicinity of a vicat softening temperature of the kneaded mixture of the rubber component (A) and the thermoplastic resin (B) from the viewpoint of the image clarity. Specifically, the mold temperature is set at a temperature range preferably from a temperature lower by 25° C. to a temperature higher by 20° C., and more preferably from a temperature lower by 15° C. to a temperature higher by 5° C. than the vicat softening temperature according to ISO 306. Under this condition, the transferability to the cavity surface can be improved, resulting in obtaining an injection-molded article with higher image clarity.

In general, when the cavity surface temperature is high, time required for cooling becomes long and hence a molding cycle becomes disadvantageously long. Therefore, the rapid heat cycle molding in which the cavity surface is heated and cooled in short time is preferably employed. Thus, improvement of the image clarity and the productivity can be both achieved. A cooling rate of the surface of the molding largely affects the image clarity of the molding, and it is cooled at a rate of preferably 1 to 100° C./sec, more preferably 30 to 90° C./sec and particularly preferably 40 to 80° C./sec.

Alternatively, a molding method in which the mold temperature is increased/decreased by using a mold having a steam pipe or an electric heated wire therein or a molding method in which supercritical $CO_2$ is used can be suitably employed.

A temperature of the resin (the kneaded mixture) in the injection molding is preferably set at a temperature suitable for the resin to be molded. In using, for example, an ABS resin, rubber modified polystyrene or a methyl methacrylate resin, the resin temperature is preferably 220 to 260° C., and in using a resin containing polycarbonate, the resin temperature is preferably 260 to 300° C.

The injection-molded article of the present invention is injected at an injection speed of preferably 1 to 50 mm/s and more preferably 5 to 30 mm/s from the viewpoint of the scratch resistance.

The injection-molded article of the present invention is produced in the aforementioned manner, and as a method for accelerating the kneading of the thermoplastic resin (B) and the rubber component (A) for improving a dispersion state of the rubber component (A) in the thermoplastic resin, for example, the following method can be employed.

In melt kneading the rubber component and the thermoplastic resin, when the rubber component is, for example, in the form of bulk, the rubber component is preferably precedently refined. For refining the rubber component, a method in which the rubber component (A) having been cooled to a temperature of the Tg or less to be solidified is finely crushed can be employed. The rubber component can be cooled to the temperature of the Tg or less by using, for example, liquid nitrogen or a dry ice/acetone solvent. The cooled rubber component can be refined, for example, by charging it in a mill or hitting it with a hammer.

Furthermore, if both the rubber component (A) and the thermoplastic resin (B) are in the form of a latex obtained through the emulsion polymerization, after they are mixed in the state of the latex, a polymer component can be agglomerated so as to take out the mixture.

As another method for easily dispersing the rubber component (A) in the thermoplastic resin (B) so as to obtain good dispersions, compatibility between a part of the rubber component (A) and the thermoplastic resin (B) is improved. For improving the compatibility, the following methods can be employed.

a) If the rubber component (A) to be used is in the form of particulates, such as a finely divided rubber powder obtained by crushing, the surface of the finely divided rubber powder is coated with the thermoplastic resin. The surface of the rubber can be coated by, for example, immersing the finely divided rubber powder in a solution of the thermoplastic resin and drying the resultant rubber powder. This method is applicable when the rubber component (A) is made of a rubbery polymer containing no graft constituent.

b) If the rubbery polymer of the rubber component (A) is a copolymer block, the thermoplastic resin (B) having high compatibility with a block portion is selected. If, for example, a copolymer block of a vinyl aromatic monomer unit and a conjugated diene monomer unit or a hydrogenated copolymer obtained by hydrogenating the copolymer block is used as the rubber component (A), a single polyphenylene ether resin, an alloy of a polyphenylene ether resin and a polystyrene resin or a polystyrene resin can be used as the thermoplastic resin (B).

c) If a compatibility accelerator for the rubber component (A) and the thermoplastic resin (B) is added, for example, a copolymer block of a vinyl aromatic monomer unit and a conjugated diene monomer or a hydrogenated substance of the copolymer block is used as the compatibility accelerator.

d) If a rubbery polymer containing a graft constituent is used as the rubber component (A), the dispersibility of the rubbery polymer can be improved by increasing compatibility between the graft constituent and the thermoplastic resin (B) by using a compatibility accelerator.

In the present invention, one of the methods a) to d) can be singly employed or some of them can be employed in combination.

EXAMPLES

Examples is described below. Evaluation was conducted in accordance with the following methods.

(1) Test for Image Clarity

The image clarity of a surface of an injection-molded article was measured by using an image clarity meter (manufactured by Suga Test Instruments Co., Ltd., Image clarity meter ICM-10P, slit width: 1 mm, reflection angle: 45°). The image clarity was obtained as an average of image clarity on a gate side and image clarity on a non-gate side of a color plate injection-molded article. The measurement was performed twice, and an average of the two measurement values was used for evaluation.

(2) Notched Charpy Impact Test

After cutting a test piece with a length of 8 cm and a width of 1 cm out from an injection-molded article, a notch treatment in a prescribed size was provided on the test piece before the test according to ISO 179. An average of values obtained in five test pieces was used as a test value.

(3) Fiber Abrasion Test

A black flat plate of 9 cm×5 cm×2.5 mm was used as a test piece, and a continuously rubbing operation for a surface of the injection-molded article with fiber was performed by using a Gakushin-type rubbing tester. Eight sheets of tissue paper (Ellemoi Tissue Paper, manufactured by Kamishoji Corporation) were piled and then folded by three times were used as the fiber. The rubbing was performed through 20 reciprocating motions in a direction along which the fiber could be easily torn with a rubbing load of 500 g at a stroke of 60 mm at a speed of 50 mm/sec.

Before and after the continuously rubbing operation, the L* value of the surface of the injection-molded article was measured so as to check change thereof.

Here, the L* value is a brightness index and corresponds to L* of the L*a*b* colorimetric system of CIE 1976, and was measured by using S&M Colour Computer Model SM-5 manufactured by Suga Test Instruments Co., Ltd.

(4) Continuous Loading Surface Property Test

The continuous loading surface property test was carried out by using HEIDON Type 22 manufactured by Shinto Scientific Co., Ltd. A sapphire needle with a radius of 0.3 mm having a spherical tip was used. The driving speed was set to 10 mm/50 sec, and the load was changed by 1 g/sec so that load of 50 g could be applied after 50 seconds. The test was conducted three times and an average thus obtained was regarded as a result.

(5) Measurement of Mass Average Particle Size

An ultrathin section with a thickness of 60±2 nm was cut out from an injection-molded article and was dyed with, for example, osmic acid if butadiene was used, and the resultant piece was observed with a transmission electron microscope (TEM). A mass average particle size can be obtained by analyzing a microphotograph with image analysis software. If a mass average particle size can not be analyzed through the observation, it means that the rubber component (A) is not dispersed in the thermoplastic resin (B).

(6) Measurement of Volatile Component in Raw Material for Injection-Molded Article After drying 1 kg of a raw material prior to the molding by using a dryer for 3 hours, the resultant material was weighed (to obtain a weight P), and thereafter, the material was dried by using a dryer for 10 minutes at 200° C., and the resultant was weighed (to obtain a weight Q). A volatile component having a boiling point of 200° C. or less can be obtained in accordance with the following expression:

Volatile component with boiling point of 200° C. or less=(weight $Q$−weight $P$)/weight $P$ (7) Composition Analysis The composition was analyzed by using a Fourier transform infrared spectrophotometer (FT-IR) (manufactured by JASCO Corporation).

(8) Reduced Viscosity

A sample solution prepared by dissolving 0.25 g of a sample in 50 ml of 2-butanone was used for obtaining the reduced viscosity by measuring efflux time in a Cannon-Fenske type capillary at 30° C.

(9) Surface Roughness

The surface roughness was measured by using Surfcom 570A-3D (a surface texture and contour measuring instrument) manufactured by Tokyo Seimitsu Co., Ltd.

(10) Vicat Softening Temperature

The Vicat softening temperature was measured by using an ISO dumbbell specimen (with a thickness of 4 mm) in accordance with ISO 306.

(11) Swelling Index

After immersing a rubber component in toluene at 25° C. for 48 hours, the rubber component was taken out and washed with a slight amount of toluene, toluene remaining on the surface was wiped off, and the mass (W1) of the resultant rubber component was measured. Next, the rubber component was dried for 30 minutes with a hot air dryer set at 60° C. and then further dried for 14 hours with a vacuum dryer set at 60±2° C. Thereafter, the rubber component was allowed to stand to cool for 30 minutes in a desiccator, and the mass (W2) of the resultant rubber component was measured.

On the basis of the thus obtained masses W1 and W2, the swelling index was obtained in accordance with the following equation:

Swelling index (%)=$[(W1-W2)/W2]\times 100$

A larger swelling index corresponds to a lower degree of crosslinking.

(12) Measurement Method for Acetone Insoluble

The content of an acetone insoluble contained in an injection-molded article and the coefficient of linear expansion thereof can be checked as follows:

Two dry centrifuge tubes were prepared for each sample, and the centrifuge tubes were allowed to stand to cool in a desiccator for 15 minutes or more and were precisely weighed up to 0.1 mg with an electronic balance.

Approximately 1 g of an injection-molded article was cut out and weighed into each of the centrifuge tubes, and the resulting tubes were precisely weighed up to 0.1 mg. Approximately 20 ml of acetone was collected in a measuring cylinder and put in each of the centrifuge tubes, silicone stoppers were put in the tubes and the resulting tubes were shook with a shaker for 2 hours.

After the shaking, the sample adhered onto each silicone stopper was put into the centrifuge tube with a slight amount of acetone. The two centrifuge tubes were set on a diagonal line in a rotor of a Hitachi high-speed cooled centrifuge. The centrifuge was operated for performing centrifugation at a speed of rotation of 20000 rpm for 60 minutes. After completing the centrifugation, the centrifuge tubes were taken out of the rotor, and resultant supernatants were decanted.

Approximately 20 ml of acetone was collected in a measuring cylinder and put in each of the centrifuge tubes, silicone stoppers were put in the tubes and the resulting tubes were shook with a shaker for 1 hour. This operation was repeated once again, and then, the centrifugation was performed at a speed of rotation of 20000 rpm for 50 minutes.

After completing the centrifugation, the centrifuge tubes were taken out of the rotor, and resultant supernatants were decanted. The same operation as that for the second decantation was performed once again.

Approximately 20 ml of methanol was collected in a measuring cylinder. The centrifugation was conducted at a speed of rotation of 20000 rpm for 30 minutes. After completing the centrifugation, the centrifuge tubes were taken out of the rotor and resultant supernatants were decanted. After drying the resultants at 80° C. for 30 minutes, the resultants were further dried at 130° C. for 30 minutes. After the drying, the resultants were allowed to stand to cool in a desiccator for 30 minutes or more. After allowing them to stand to sufficiently cool, each of the resultant samples was precisely weighed up to 0.1 mg with an electronic balance, and an acetone insoluble was calculated in accordance with the following equation:

Acetone insoluble (mass %)=[amount of acetone insoluble (g)÷amount of sample (g)]×100

If the injection-molded article contains an inorganic insoluble, the following equation is used for the calculation:

Acetone insoluble (mass %)=[(acetone insoluble including inorganic insoluble (mass %)–inorganic insoluble (mass %))/(100%–inorganic insoluble (mass %)]×100

An inorganic insoluble herein means, for example, titanium, glass fiber, talc, calcium carbonate or the like used in a color pigment.

(13) Measurement of Coefficient of Linear Expansion

A sample used for measurement of a coefficient of linear expansion of an acetone insoluble was obtained by drying a precipitate obtained after the decantation of (12), removing an inorganic substance therefrom and solidifying the resultant through thermal compression molding or the like. The measurement of a coefficient of linear expansion was conducted in accordance with ASTM D696.

Incidentally, lubrication agents used in the examples are as follows:

Lubrication assistant (C-1): SAN WAX E-250P manufactured by Sanyo Chemical Industries Ltd. (weight average molecular weight: 10000, acid number: 20)

Lubrication assistant (C-2): NUC3195 manufactured by The Dow Chemical Company

Lubrication assistant (C-3): SAK-CS-PPT-1 manufactured by Shinagawa Chemical Industries Co., Ltd.

Preparation Example 1 for Rubber Component (Polymer) (A)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.28 μm, solid content: 40 mass %, swelling index: 41%), 0.1 part by mass of tertiary dodecyl mercaptan and 25 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 12 parts by mass of acrylonitrile, 48 parts by mass of styrene, 0.5 part by mass of tertiary dodecyl mercaptan and 0.15 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried, so as to give a polymer (A-1). Here, a thermoplastic resin (copolymer) (B-1) was simultaneously obtained. Ratios of the polymer (A-1) and the copolymer (B-1) were 70 mass % and 30 mass %. As a result of the composition analysis with a Fourier transform infrared spectrophotometer (FT-IR), the polymer (A-1) was found to contain 8.6 mass % of acrylonitrile, 57.1 mass % of butadiene and 34.3 mass % of styrene, and have a graft ratio of 75.1% and a coefficient of linear expansion of $16.0 \times 10^{-5}/°$ C., and the copolymer (B-1) was found to contain 20.1 mass % of acrylonitrile and 79.9 mass % of styrene, and the copolymer (B-1) was found to have reduced viscosity of 0.33 dl/g.

Preparation Example 2 for Rubber Component (Polymer) (A)

In the same manner as in Preparation Example 1 for a polymer (A) except that 24 parts by mass of acrylonitrile and 36 parts by mass of styrene were used, 69.9 mass % of a polymer (A-2) and 30.1 mass % of a copolymer (B-2) were obtained. As a result of the composition analysis, the polymer (A-2) was found to contain 17.1 mass % of acrylonitrile, 57.2 mass % of butadiene and 25.7 mass % of styrene and have a graft ratio of 74.8% and a coefficient of linear expansion of $15.8 \times 10^{-5}/°$ C., and the copolymer (B-2) was found to contain 39.9 mass % of acrylonitrile and 60.1 mass % of styrene, and the polymer (B-2) was found to have reduced viscosity of 0.40 dl/g.

Preparation Example 3 for Rubber Component (Polymer) (A)

A polymerization reaction vessel was charged with 110 parts by mass of polybutadiene rubber latex (mass average particle size, measured with a microtrac grain size analysis instrument "nanotrac 150" manufactured by Nikkiso Co., Ltd.: 0.28 μm, solid content: 40 mass %, swelling index: 41%), 0.05 part by mass of tertiary dodecyl mercaptan and 45 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 24 parts by mass of acrylonitrile, 36 parts by mass of styrene, 0.05 part by mass of tertiary dodecyl mercaptan and 0.3 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (A-3). Here, a copolymer (B-3) was simultaneously obtained. Ratios of the polymer (A-3) and the copolymer (B-3) were 87.9 mass % and 12.1 mass %. As a result of the composition analysis with a Fourier transform infrared spectrophotometer (FT-IR), the polymer (A-3) was found to contain 21.9 mass % of acrylonitrile, 45.5 mass % of butadiene and 32.6 mass % of styrene, and have a graft ratio of 119.8% and a coefficient of linear expansion of $13.9 \times 10^{-5}/°$ C., and the copolymer (B-3) was found to contain 39.8 mass % of acrylonitrile and 60.2 mass % of styrene, and the copolymer (B-3) was found to have reduced viscosity of 0.33 dl/g.

Preparation Example 4 for Rubber Component (Polymer) (A)

A polymerization reaction vessel was charged with 140 parts by mass of polybutadiene rubber latex (mass average particle size, measured with a microtrac grain size analysis instrument "nanotrac 150" manufactured by Nikkiso Co., Ltd.: 0.31 μm, solid content: 50 mass %, swelling index: 40%), 0.075 part by mass of tertiary dodecyl mercaptan and 5 parts by mass of deionized water, an atmosphere in a gas phase part was replaced with nitrogen, and the temperature was elevated to 50° C. Subsequently, while elevating the temperature to 65° C. over 1 hour, a monomer mixed solution consisting of 13.5 parts by mass of acrylonitrile, 36.5 parts by mass of styrene, 0.25 part by mass of tertiary dodecyl mercaptan and 0.1 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (A-4). Here, a copolymer (B-4) was simultaneously obtained. Ratios of the polymer (A-4) and the copolymer (B-4) were 73.4 mass % and 26.6 mass %. As a result of the composition analysis with a Fourier transform infrared spectrophotometer (FT-IR), the polymer (A-4) was found to contain 8.6 mass % of acrylonitrile, 68.1 mass % of butadiene and 23.3 mass % of styrene, and have a graft ratio of 46.8% and a coefficient of linear expansion of $17.9 \times 10^{-5}/°$ C., and the copolymer (B-4) was found to contain 27.1 mass % of acrylonitrile and 72.9 mass % of styrene, and the copolymer (B-4) was found to have reduced viscosity of 0.38 dl/g.

Preparation Example 5 for Rubber Component (Polymer) (A)

A polymerization reaction vessel was charged with 140 parts by mass of polybutadiene rubber latex (mass average particle size, measured with a microtrac grain size analysis instrument "nanotrac 150" manufactured by Nikkiso Co., Ltd.: 0.28 μm, solid content: 50 mass %, swelling index: 40%), 0.1 part by mass of tertiary dodecyl mercaptan and 5 parts by mass of deionized water, an atmosphere in a gas phase part was replaced with nitrogen, and the temperature was elevated to 50° C. Subsequently, while elevating the temperature to 65° C. over 1 hour, a monomer mixed solution consisting of 13.5 parts by mass of acrylonitrile, 36.5 parts by mass of styrene, 0.3 part by mass of tertiary dodecyl mercaptan and 0.05 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (A-5). Here, a copolymer (B-5) was simultaneously obtained. Ratios of the polymer (A-5) and the copolymer (B-5) were 65.1 mass % and 34.9 mass %. As a result of the composition analysis with a Fourier transform infrared spectrophotometer (FT-IR), the polymer (A-5) was found to contain 6.2 mass % of acrylonitrile, 77.1 mass % of butadiene and 16.7 mass % of styrene, and have a graft ratio of 30.0% and a coefficient of linear expansion of $19.4 \times 10^{-5}/°$ C., and the copolymer (B-5) was found to contain 27.0 mass % of acrylonitrile and 73.0 mass % of styrene, and the copolymer (B-5) was found to have reduced viscosity of 0.36 dl/g.

Preparation Example 6 for Rubber Component (Polymer) (A)

A polymerization reaction vessel was charged with 100 parts by mass of polybutadiene rubber latex (mass average particle size, measured with a microtrac grain size analysis instrument "nanotrac 150" manufactured by Nikkiso Co., Ltd.: 0.28 μm, solid content: 30 parts by mass swelling index: 41%), 0.01 part by mass of tertiary dodecyl mercaptan and 45 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 18.9 parts by mass of acrylonitrile, 51.1 parts by mass of styrene, 0.01 part by mass of tertiary dodecyl mercaptan and 0.5 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (A-6). Here, a copolymer (B-6) was simultaneously obtained. Ratios of the polymer (A-6) and the copolymer (B-6) were 85.7 mass % and 14.3 mass %. As a result of the composition analysis with a Fourier transform infrared spectrophotometer (FT-IR), the polymer (A-6) was found to contain 17.5 mass % of acrylonitrile, 35.0 mass % of butadiene and 47.5 mass % of styrene, and have a graft ratio of 185.7% and a coefficient of linear expansion of $12.2 \times 10^{-5}$/° C., and the copolymer (B-6) was found to contain 27.1 mass % of acrylonitrile and 72.9 mass % of styrene, and the copolymer (B-6) was found to have reduced viscosity of 0.33 dl/g.

Preparation Example 7 for Rubber Component (Polymer) (A)

A polymerization reaction vessel was charged with 100 parts by mass of polybutadiene rubber latex (mass average particle size, measured with a microtrac grain size analysis instrument "nanotrac 150" manufactured by Nikkiso Co., Ltd.: 0.28 μm, solid content: 40 parts by mass, swelling index: 18%), 0.01 part by mass of tertiary dodecyl mercaptan and 45 parts by mass of deionized water, an atmosphere in a gas phase part was replaced with nitrogen, and the temperature was elevated to 55° C. Subsequently, while elevating the temperature to 70° C. over 1.5 hours, a monomer mixed solution consisting of 18.9 parts by mass of acrylonitrile, 51.1 parts by mass of styrene, 0.01 part by mass of tertiary dodecyl mercaptan and 0.5 part by mass of cumene hydroperoxide, and an aqueous solution of 0.2 part by mass of sodium formaldehyde sulfoxylate, 0.004 part by mass of ferrous sulfate and 0.04 part by mass of disodium ethylenediaminetetraacetate dissolved in 22 parts by mass of deionized water were added thereto over 4 hours. After the addition, a polymerization reaction was conducted for 1 hour and completed while controlling the polymerization reaction vessel at 70° C.

To the thus obtained ABS latex, a silicone resin antifoaming agent and a phenol antioxidant emulsion were added, and thereafter, an aluminum sulfate aqueous solution was further added thereto for solidification. The thus solidified substance was sufficiently dehydrated and washed with water, and the resultant was dried so as to give a polymer (A-7). Here, a copolymer (B-7) was simultaneously obtained. Ratios of the polymer (A-7) and the copolymer (B-7) were 58.6 mass % and 41.4 mass %. As a result of the composition analysis with a Fourier transform infrared spectrophotometer (FT-IR), the polymer (A-7) was found to contain 6.4 mass % of acrylonitrile, 68.3 mass % of butadiene and 25.3 mass % of styrene, and have a graft ratio of 46.4% and a coefficient of linear expansion of $12.9 \times 10^{-5}$/° C., and the copolymer (B-7) was found to contain 20.1 mass % of acrylonitrile and 79.9 mass % of styrene, and the copolymer (B-7) was found to have reduced viscosity of 0.34 dl/g.

Preparation Example 8 for Rubber Component (Polymer) (A)

To a solution of 5 parts by mass of polybutadiene rubber (manufactured by Zeon Corporation, trade name: Nipol 1220SL, mass average particle size: 1.1 μm, swelling index: 65%) dissolved in 80 parts by mass of a styrene monomer, 14 parts by mass of ethyl benzene, 0.04 part by mass of 1,1-bis(t-butylperoxy)3,3,5-trimethylcyclohexane (manufactured by Nihon Yushi Co., Ltd., trade name: Perhexa 3M), 0.20 part by mass of α methyl styrene dimer and 0.05 part by mass of a phenol antioxidant (manufactured by ELIOKEM, trade name: Wingstay L) were added so as to prepare a raw material solution. The raw material solution was supplied continuously at 2 liter/hr to a first reaction vessel having an internal volume of 6 liters and equipped with a stirrer, and with the temperature adjusted so as to attain a solid concentration of 35% at an outlet of the first reaction vessel, phase transition from a liquid to a solid was completed, whereby forming particles. The rate of stirring of the first reaction vessel was 90 rotations/min. Furthermore, the polymerization was continuously performed by using a second reaction vessel and a third reaction vessel with the same type and the same internal volume as the first reaction vessel wherein the temperatures within the vessels were adjusted so as to attain solid concentrations of 55 to 60% and 68 to 73% respectively at outlets of the second and third reaction vessels.

Subsequently, the thus obtained reactant was fed to a vacuum devolatilizing apparatus at 230° C. for removing unreacted portions of the styrene monomer and the solvent, and the resultant was granulated with an extruder so as to obtain a polymer (A-8). Here, a copolymer (B-8) was simultaneously obtained. Ratios of the polymer (A-8) and the copolymer (B-8) were 13.1 mass % and 86.9 mass %. As a result of the composition analysis with a Fourier transform infrared spectrophotometer (FT-IR), the polymer (A-8) was found to contain 61.8 mass % of styrene and 38.2 mass % of polybutadiene, and have a graft ratio of 162% and a coefficient of linear expansion of $12.7 \times 10^{-5}$/° C., and the copolymer (B-8) was found to contain 100 mass % of styrene, and the copolymer (B-8) was found to have reduced viscosity of 0.55 dl/g.

Preparation Example 1 for Thermoplastic Resin (Copolymer) (B)

A mixture consisting of 13 parts by mass of acrylonitrile, 52 parts by mass of styrene, 35 parts by mass of toluene serving as a solvent and 0.05 part by mass of t-butylperoxy-2-ethylhexanoate serving as a polymerization initiator was bubbled with a nitrogen gas, and the resultant mixture was supplied, by using a spray nozzle, continuously at a speed of 37.5 kg/hr to a reaction vessel having an internal volume of 150 l and equipped with two inclined paddle impellers (inclination angle: 45 degrees) similar to one described in Example 2 of Japanese Patent No. 3664576.

The polymerization temperature was set at 130° C., and the reaction solution was continuously drawn out in the same amount as the supplied mixed solution so as to keep a filling rate of 70 vol % of the reaction solution in the reaction vessel. A portion of the reaction vessel corresponding to a liquid phase part is equipped with a jacket for adjusting the temperature, and the jacket temperature was 128° C. The stirring power requirement was 4 kW/m, and the polymerization conversion rate was 39.8 wt %/hr.

The drawn reaction solution was introduced to a volatile removing apparatus kept at 250° C. and high vacuum of 10 mmHg for recovering an unreacted portion of the monomer and the organic solvent through degassing, so as to recover a copolymer (B-9) as form of pellets.

As a result of the composition analysis with a Fourier transform infrared spectrophotometer (FT-IR), the copolymer (B-9) was found to contain 20.8 mass % of acrylonitrile and 79.2 mass % of styrene. Besides, the reduced viscosity was 0.75 dl/g.

Furthermore, the Rockwell hardness (on the M scale) of the copolymer (B-9) was measured and found to be 81.

Preparation Example 2 for Thermoplastic Resin (Copolymer) (B)

A copolymer (B-10) was prepared in the same manner as in Preparation Example 1 for a copolymer (B) except that a mixture of 35 parts by mass of acrylonitrile, 35 parts by mass of styrene, 30 parts by mass of toluene serving as a solvent and 0.05 part by mass of t-butylperoxy-2-ethylhexanoate serving as a polymerization initiator was used as the solution to be supplied to the reaction vessel and that the temperature of the temperature adjusting jacket was set at 130° C. The polymerization conversion rate was 31.5 wt %/hr.

The drawn reaction solution was introduced to a volatile removing apparatus kept at 250° C. and high vacuum of 10 mmHg for recovering an unreacted portion of the monomer and the organic solvent through degassing, so as to recover a copolymer (B-10) as form of pellets.

As a result of the composition analysis with a Fourier transform infrared spectrophotometer (FT-IR), the copolymer (B-10) was found to contain 40.6 mass % of acrylonitrile and 59.4 mass % of styrene. Besides, the reduced viscosity was 0.58 dl/g.

Furthermore, the Rockwell hardness (on the M scale) of the copolymer (B-10) was measured and found to be 90.

Preparation Example 3 for Thermoplastic Resin (Copolymer) (B)

A copolymer (B-11) was prepared in the same manner as in Preparation Example 1 for a copolymer (B) except that a mixture of 21 parts by mass of acrylonitrile, 47 parts by mass of styrene, 32 parts by mass of toluene serving as a solvent and 0.05 part by mass of t-butylperoxy-2-ethylhexanoate serving as a polymerization initiator was used as the solution to be supplied to the reaction vessel and that the temperature of the temperature adjusting jacket was set at 129° C. The polymerization conversion rate was 39.3 wt %/hr.

The drawn reaction solution was introduced to a volatile removing apparatus kept at 250° C. and high vacuum of 10 mmHg for recovering an unreacted portion of the monomer and the organic solvent through degassing, so as to recover a copolymer (B-11) as form of pellets. As a result of the composition analysis with a Fourier transform infrared spectrophotometer (FT-IR), the copolymer (B-11) was found to contain 29.8 mass % of acrylonitrile and 70.2 mass % of styrene. Besides, the reduced viscosity was 0.65 dl/g.

Furthermore, the Rockwell hardness (on the M scale) of the copolymer (B-11) was measured and found to be 83.

Preparation Example 4 for Thermoplastic Resin (Copolymer) (B)

To a monomer mixture consisting of 68.6 parts by mass of methyl methacrylate, 1.4 parts by mass of methyl acrylate and 30 parts by mass of ethyl benzene, 150 ppm of 1,1-di-t-butylperoxy-3,3,5-trimethylcyclohexane and 1500 ppm of n-octylmercaptan were added and homogeneously mixed.

The thus obtained solution was continuously supplied to an sealed pressure-resistant reactor having an internal volume of 10 liters, and polymerization was conducted under stirring at an average temperature of 135° C. with average residence time of 2 hours. The thus obtained polymerization solution was continuously fed to a storage tank connected to the reactor, so as to separate a polymer from unreacted portions of the monomers and solution, the polymer was continuously extruded in a molten state by an extruder, so as to obtain pellets of a copolymer (B-12).

The copolymer had reduced viscosity of 0.35 dl/g, and as a result of the composition analysis by pyrolysis gas chromatography, it was found that methyl methacrylate unit/methyl acrylate unit=98.0/2.0 (a mass ratio). Furthermore, as a result of quantitative determination of lauric acid and stearyl alcohol contained in the resin composition, they were determined to be contained respectively in contents of 0.03 part by mass and 0.1 part by mass based on 100 parts by mass of the resin composition.

The Rockwell hardness (on the M scale) of the copolymer (B-12) was measured and found to be 100.

Preparation Example 5 for Thermoplastic Resin (Copolymer) (B)

A copolymer (B-13) was prepared in the same manner as in Preparation Example 1 for a copolymer (B) except that a mixture of 31 parts by mass of acrylonitrile, 31 parts by mass of styrene, 8 parts by mass of butyl acrylate, 30 parts by mass of toluene serving as a solvent and 0.05 part by mass of t-butylperoxy-2-ethylhexanoate serving as a polymerization initiator was used as the solution to be supplied to the reaction vessel and that the temperature of the temperature adjusting jacket was set at 129° C. The polymerization conversion rate was 30.5 wt %/hr.

The drawn reaction solution was introduced to a volatile removing apparatus kept at 250° C. and high vacuum of 10 mmHg for recovering an unreacted portion of the monomer and the organic solvent through degassing, so as to recover a copolymer (B-13) as form of pellets.

As a result of the composition analysis with a Fourier transform infrared spectrophotometer FT-IR), the copolymer (B-13) was found to contain 39.1 mass % of acrylonitrile, 51.1 mass % of styrene and 9.8 mass % of butyl acrylate. Besides, the reduced viscosity was 0.42 dl/g.

Furthermore, the Rockwell hardness (on the M scale) of the copolymer (B-13) was measured and found to be 82.

Preparation Example for Polycarbonate Copolymer (B-14) Having High Hardness

A 500 ml glass reactor equipped with nickel (Ni) impellers was charged with 0.30 mol of 1,1-bis(4-hydroxy-3,5-dimethylphenyl)methane, 0.30 mol of bisphenol A and 0.67 mol of diphenyl carbonate, and the thus obtained mixture was stirred at 180° C. for 30 minutes under $N_2$ atmosphere.

Thereafter, a 15% aqueous solution of tetramethylammonium hydroxide was added thereto in an amount corresponding to $2.5 \times 10^4$ mol per total one mol with an aromatic dihydroxy compound, and sodium hydroxide was added thereto in an amount corresponding to $1 \times 10^{-6}$ mol per total one mol with the aromatic dihydroxy compound, so as to cause an ester exchange reaction at 180° C. for 30 minutes under $N_2$ atmosphere.

Thereafter, the temperature was elevated to 210° C., the reaction was carried out for 1 hour with the pressure gradually reduced to 200 mmHg, further for 20 minutes with the temperature elevated to 240° C. and the pressure kept at 200 mmHg, further for 20 minutes with the pressure gradually lowered to 150 mmHg, further for 20 minutes with the pressure lowered to 100 mmHg, and further for 15 minutes with the pressure lowered to 15 mmHg. Then, the temperature was elevated to 280° C., and the reaction was carried out for 1.5 hours ultimately with the pressure lowered to 0.5 mmHg.

The limiting viscosity [IV] of the thus obtained polycarbonate copolymer was measured with an Ubbelohde viscometer in methylene chloride (0.5 dl/g) at 20° C. and found to be 0.50 dl/g.

Besides, the Rockwell hardness (on the M scale) of the polycarbonate copolymer was measured and found to be 58.

Preparation Example for Polyphenylene Ether (B-15)

While blowing a nitrogen gas at a flow rate of 500 mL/min into a 10 L jacketed polymerization vessel having, in a bottom portion of the vessel, a sparger for introducing an oxygen-containing gas, a stirring turbine blade and a baffle, and having a reflux condenser in a vent gas line at an upper portion of the vessel, 1.099 g of cupric chloride dihydrate, 4.705 g of 35% hydrochloric acid, 41.971 g of N,N,N',N'-tetramethyl-propanediamine, 31.658 g of di-n-butylamine, 1264 g of n-butanol, 544 g of methanol, 3792 g of xylene, 136 g of 2,6-dimethylphenol and 24 g of 2,3,6-trimethylphenol were put in the polymerization vessel. The thus obtained mixture was stirred until a homogeneous solution was obtained and the internal temperature of the reactor became 40° C.

Furthermore, while blowing a nitrogen gas at a flow rate of 200 mL/min into a 5 L storage tank having a sparger for introducing a nitrogen gas, a stirring turbine blade and a baffle therein, and having a reflux condenser in a vent gas line at an upper portion of the tank, 720 g of methanol, 1224 g of 2,6-dimethylphenol and 216 g of 2,3,6-trimethylphenol were put in the storage tank. The thus obtained mixture was stirred until a homogenous solution was obtained, and thus, a mixed solution was prepared.

Subsequently, an oxygen gas was started to be introduced through the sparger at a rate of 1000 NmL/min into the polymerization vessel under vigorous stirring, and at the same time, the mixed solution contained in the storage tank was successively added at a rate of 21.6 g/min from the storage tank by using a tubing pump. Aeration was conducted for 330 minutes so as to control the internal temperature of the reactor to 40° C. Incidentally, 140 minutes after starting the supply of the oxygen gas, polyphenylene ether was separated and took the form of a slurry, and the addition of the mixed solution had been completed before showing the slurry form. The form of the polymerization solution attained in completing the polymerization is precipitation deposition polymerization.

With the aeration of the oxygen-containing gas stopped, 11.5 g of a 50% aqueous solution of tripotassium ethylene-diaminetetraacetate (a reagent manufactured by Dojindo Laboratories) was added to the thus obtained polymerization mixture, and the resultant polymerization mixture was stirred for 60 minutes. Thereafter, hydroquinone (a reagent manufactured by Wako Pure Chemical Industries) was added thereto little by little, and the stirring was continued until the polyphenylene ether in the slurry form became white. The internal temperature of the reactor was controlled to 40° C.

Thereafter, the mixture was filtered, and wet polyphenylene ether obtained as a filtered residue was put in a 10 L washing tank together with 6400 g of methanol to be dispersed therein, the resultant was stirred for 30 minutes and filtered again, and thus, wet polyphenylene ether was obtained. The internal temperature of the washing tank was controlled at 40° C. This operation was repeated by three times, and the resultant wet polyphenylene ether was vacuum dried at 140° C. for 150 minutes, so as to give polyphenylene ether.

A solution with a concentration of 0.5 g/dl was prepared by dissolving 0.1 g of the thus obtained polyphenylene ether in chloroform, and the reduced viscosity was measured and found to be 0.55 dl/g.

Besides, the Rockwell hardness (on the M scale) of the polyphenylene ether was measured and found to be 80.

Example 1

Twenty-one parts by mass of the polymer (A-1), 9 parts by mass of the copolymer (B-1), 20 parts by mass of the copolymer (B-9) and 50 parts by mass of the copolymer (B-12) were mixed so as to disperse the polymer (A-1) component in the copolymer (B-1), the copolymer (B-9) and the copolymer (B-12) components. The resultant mixture was charged in an extruder hopper and was kneaded so as to obtain pellets of a resin composition by using a twin screw extruder (PCM-30, L/D=28, manufactured by Ikegai Tekko Kabushiki Kaisha) with a cylinder temperature set at 250° C. under conditions of a screw rotation number of 150 rpm and a discharging speed of kneaded resin of 15 kg/hr. Thereafter, the pellets were injection molded (with EC100 manufactured by Toshiba Machine Co., Ltd.) at a resin temperature of 250° C. and an injection speed of 20 mm/s, so as to produce a flat plate with a size of 10 cm×10 cm×3 mm. A mold used in the molding had been polished with a file having a grit size of #10000 for attaining a surface having surface roughness Ra of 0.01 μm. The mold temperature was set at 80° C.

Examples 2 to 13 and Comparative Examples 1 to 3

Compositions listed in Table 1 were used for obtaining pellets and injection-molded articles in the same manner as in Example 1.

Example 14

A composition listed in Table 1 was used for obtaining pellets and an injection-molded article in the same manner as in Example 1 except that the injection speed was 5 mm/s.

Comparative Example 4

After obtaining pellets by using a formulation listed in Table 1 in the same manner as in Example 1, the injection molding was performed. A mold used in the molding had been polished with a file having a grit size of #3500 for attaining a surface having surface roughness Ra of 0.05 μm. The mold temperature was set at 80° C.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Thermoplastic resin, conditions, etc. | Polymer (A-1) (parts by mass) | 21 | 21 | 21 | | | | | 21 | |
| | Polymer (A-2) (parts by mass) | | | | 28 | 28 | | | | |
| | Polymer (A-3) (parts by mass) | | | | | | | 47 | | |
| | Polymer (A-4) (parts by mass) | | | | | | | | | 36.7 |
| | Polymer (A-5) (parts by mass) | | | | | | | | | |
| | Polymer (A-6) (parts by mass) | | | | | | | | | |

TABLE 1-continued

|  |  | | | | | | | | | |
|---|---|---|---|---|---|---|---|---|---|---|
|  | Polymer (A-7) (parts by mass) | | | | | | | | | |
|  | Polymer (A-8) (parts by mass) | | | | | | | | | 28.9 |
|  | Copolymer (B-1) (parts by mass) | 9 | 9 | 9 | | | | | 9 | |
|  | Copolymer (B-2) (parts by mass) | | | | 12 | 12 | | | | |
|  | Copolymer (B-3) (parts by mass) | | | | | | | 6.5 | | |
|  | Copolymer (B-4) (parts by mass) | | | | | | | | | 13.3 |
|  | Copolymer (B-5) (parts by mass) | | | | | | | | | |
|  | Copolymer (B-6) (parts by mass) | | | | | | | | | |
|  | Copolymer (B-7) (parts by mass) | | | | | | | | | |
|  | Copolymer (B-8) (parts by mass) | | | | | | | | | 71.1 |
|  | Copolymer (B-9) (parts by mass) | 20 | 20 | 20 | | | | | 20 | |
|  | Copolymer (B-10) (parts by mass) | | | | 60 | | | | | |
|  | Copolymer (B-11) (parts by mass) | | | | | | | | 50 | |
|  | Copolymer (B-12) (parts by mass) | 50 | 50 | 50 | | | | | | |
|  | Copolymer (B-13) (parts by mass) | | | | | 60 | 46.5 | | | |
|  | Copolymer (B-14) (parts by mass) | | | | | | | 50 | | |
|  | Copolymer (B-15) (parts by mass) | | | | | | | | | |
|  | Lubrication assistant C-1 (parts by mass) | | 1 | | | | | | 1 | 1 |
|  | Lubrication assistant C-2 (parts by mass) | | | 1 | | | | | | |
|  | Lubrication assistant C-3 (parts by mass) | | | 0.5 | 0.5 | | | | 0.5 | 0.5 |
|  | Coloring agent 1 | 0.5 | 0.5 | 0.5 | 0.5 | 0.5 | 0.5 | 0.5 | 0.5 | 0.5 |
|  | Volatile component (200° C.) (ppm) | 1200 | 1250 | 1240 | 810 | 850 | 800 | 900 | 1500 | 800 |
|  | Mass average particle size (μm) | 0.28 | 0.28 | 0.28 | 0.28 | 0.28 | 0.28 | 0.28 | 0.31 | 1.1 |
|  | Surface roughness (of mold) (μm) | 0.01 | 0.01 | 0.01 | 0.01 | 0.01 | 0.01 | 0.01 | 0.01 | 0.01 |
| Molded article, properties, etc. | Vicat softening temperature (° C.) | 80 | 79 | 80 | 102 | 89 | 90 | 109 | 98 | 78 |
|  | Image clarity (%) | 97 | 95 | 96 | 95 | 94 | 95 | 93 | 93 | 62 |
|  | Surface roughness (Ra) (μm) | 0.02 | 0.02 | 0.02 | 0.02 | 0.02 | 0.02 | 0.02 | 0.1 | 0.1 |
|  | Continuous loading surface property tester (gf) | 2 | 1.6 | 1.6 | 1.7 | 1.4 | 0.5 | 2.5 | 2.8 | 2.7 |
|  | Fiber abrasion test — L* prior to test | 9 | 9 | 9 | 10.9 | 10.2 | 9.5 | 12 | 11.3 | 10.8 |
|  | Fiber abrasion test — L* increase (%) after test | 55 | 18 | 20 | 6 | 7 | 6 | 25 | 60 | 58 |
|  | Charpy impact test (kJ/m²) | 8 | 7.5 | 8.2 | 15.2 | 13.3 | 10.1 | 54 | 10.5 | 5 |

|  |  | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|
| Thermoplastic resin, conditions, etc. | Polymer (A-1) (parts by mass) | | | | 21 | | 15 | | | 21 |
|  | Polymer (A-2) (parts by mass) | | | | | | | | | |
|  | Polymer (A-3) (parts by mass) | | | | | 47 | | | | |
|  | Polymer (A-4) (parts by mass) | | 55 | 55 | | | | | | |
|  | Polymer (A-5) (parts by mass) | | | | | | | | 35 | |

TABLE 1-continued

|  |  | C1 | C2 | C3 | C4 | C5 | C6 | C7 | C8 | C9 |
|---|---|---|---|---|---|---|---|---|---|---|
|  | Polymer (A-6) (parts by mass) |  |  |  |  |  |  |  | 28 |  |
|  | Polymer (A-7) (parts by mass) | 21 |  |  |  |  |  |  |  |  |
|  | Polymer (A-8) (parts by mass) |  |  |  |  |  |  |  |  |  |
|  | Copolymer (B-1) (parts by mass) |  |  | 9 |  | 6.5 |  |  |  | 9 |
|  | Copolymer (B-2) (parts by mass) |  |  |  |  |  |  |  |  |  |
|  | Copolymer (B-3) (parts by mass) |  |  |  |  | 6.5 |  |  |  |  |
|  | Copolymer (B-4) (parts by mass) |  | 20 | 20 |  |  |  |  |  |  |
|  | Copolymer (B-5) (parts by mass) |  |  |  |  |  |  | 10.4 |  |  |
|  | Copolymer (B-6) (parts by mass) |  |  |  |  |  |  |  | 4.7 |  |
|  | Copolymer (B-7) (parts by mass) | 14.8 |  |  |  |  |  |  |  |  |
|  | Copolymer (B-8) (parts by mass) |  |  |  |  |  |  |  |  |  |
|  | Copolymer (B-9) (parts by mass) | 14.2 |  |  | 50 |  | 40 |  |  | 20 |
|  | Copolymer (B-10) (parts by mass) |  |  |  |  |  |  |  |  |  |
|  | Copolymer (B-11) (parts by mass) |  | 25 | 25 |  |  |  | 54.6 | 67.3 |  |
|  | Copolymer (B-12) (parts by mass) | 50 |  |  |  |  | 38.5 |  |  | 50 |
|  | Copolymer (B-13) (parts by mass) |  |  |  |  | 46.5 |  |  |  |  |
|  | Copolymer (B-14) (parts by mass) |  |  |  |  |  |  |  |  |  |
|  | Copolymer (B-15) (parts by mass) |  |  |  | 20 |  |  |  |  |  |
|  | Lubrication assistant C-1 (parts by mass) |  |  |  |  |  |  | 1 | 1 | 1 |
|  | Lubrication assistant C-2 (parts by mass) |  |  |  |  |  |  |  |  |  |
|  | Lubrication assistant C-3 (parts by mass) |  |  |  |  |  |  | 0.5 | 0.5 | 0.5 |
|  | Coloring agent 1 | 0.5 | 0.5 | 0.5 | 0.5 | 0.5 | 0.5 | 0.5 | 0.5 | 0.5 |
|  | Volatile component (200° C.) (ppm) | 1200 | 1000 | 1000 | 1200 | 800 | 860 | 1450 | 800 | 1250 |
|  | Mass average particle size (μm) | 0.28 | 0.31 | 0.31 | 0.28 | 0.28 | 0.28 | 0.28 | 0.28 | 0.28 |
|  | Surface roughness (of mold) (μm) | 0.01 | 0.01 | 0.01 | 0.01 | 0.01 | 0.01 | 0.01 | 0.01 | 0.05 |
| Molded article, properties, etc. | Vicat softening temperature (° C.) | 81 | 97 | 97 | 105 | 90 | 102 | 97 | 97 | 80 |
|  | Image clarity (%) | 95 | 72 | 75 | 96 | 95 | 94 | 58 | 93 | 46 |
|  | Surface roughness (Ra) (μm) | 0.02 | 0.13 | 0.12 | 0.02 | 0.02 | 0.02 | 0.15 | 0.1 | 0.2 |
|  | Continuous loading surface property tester (gf) | 1.6 | 3.5 | 3.5 | 2 | 0.5 | 1.3 | 2.1 | 2.3 | 2.5 |
|  | Fiber abrasion test — L* prior to test | 9.5 | 11.5 | 11.5 | 9.5 | 9.5 | 9.2 | 11.8 | 9.8 | 9.2 |
|  | Fiber abrasion test — L* increase (%) after test | 35 | 65 | 70 | 60 | 3 | 15 | 5.4 | 10 | 58 |
|  | Charpy impact test (kJ/m²) | 10.2 | 32.5 | 33 | 6 | 9.8 | 3 | 9.5 | 3 | 8 |

As a result, it is understood that the injection-molded article of the present invention is uncoated, has high image clarity and is effective to attain excellent impact resistance and scratch resistance.

INDUSTRIAL APPLICABILITY

Since the injection-molded article of the present invention has high image clarity and is excellent in impact resistance, it can be used as a housing for a luxury household electrical appliance, a game machine, a camera, a cellular phone or the like, a decorative frame of a television set or the like, or an interior material for a vehicle. Applicable household electrical appliances are a television set, a telephone, a printer, a computer, a vacuum cleaner, a loud speaker and the like, and applicable interior materials for a vehicle are a center cluster, a switch board, a pillar and the like.

The invention claimed is:

1. A process for producing an uncoated highly reflective impact-resistant injection-molded article, comprising a rubber component (A) and a thermoplastic resin (B), wherein (1) the rubber component (A) is dispersed in the thermoplastic resin (B), (2) the rubber component (A) has a coefficient of linear expansion of $12.5 \times 10^{-5}$ to $19 \times 10^{-5}/°C$,
(3) the injection-molded article has a surface with image clarity of 60 to 100%, and
(4) the injection-molded article has notched Charpy impact strength of 5 to 60 kJ/m², and
wherein injection molding is performed by using a mold having surface roughness Ra of 0.02 μm or less.

* * * * *